July 12, 1932.  P. SOULARY  1,866,951
APPARATUS FOR THE PNEUMATIC SEPARATION OF MATERIALS OF DIFFERENT DENSITIES
Filed Aug. 12, 1929   3 Sheets-Sheet 1
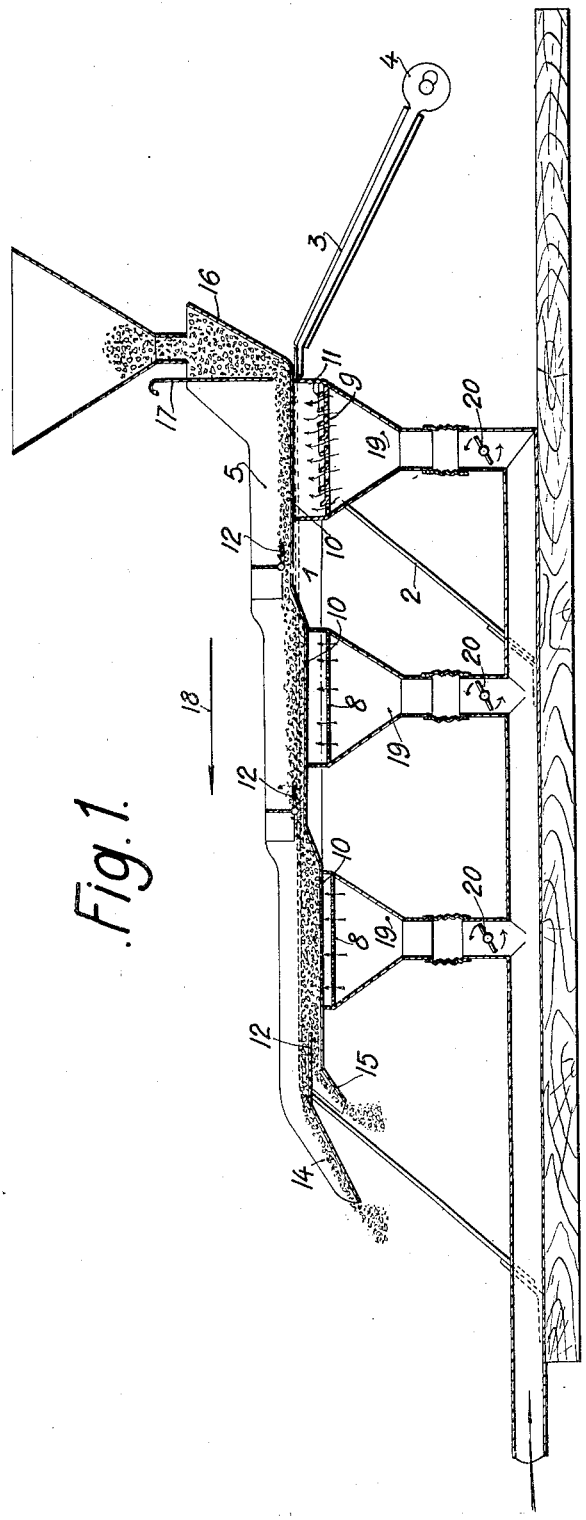
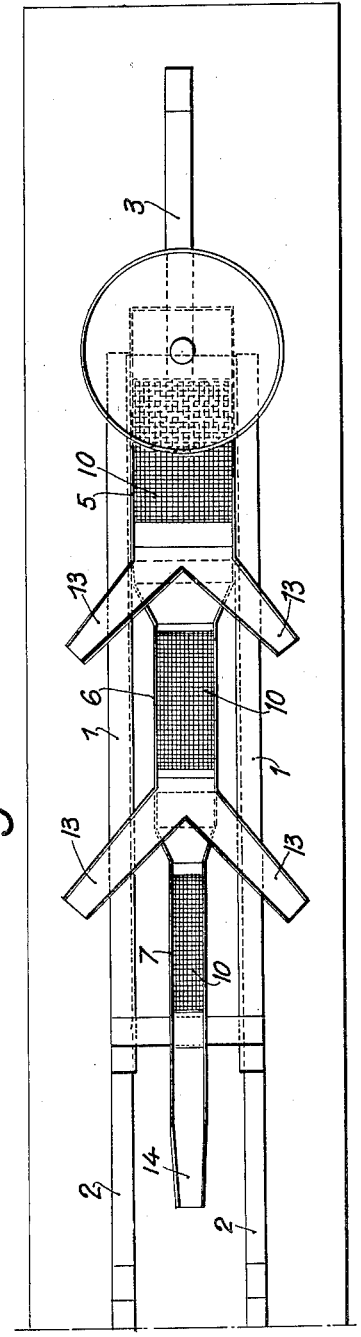
P. Soulary
INVENTOR
By Marks & Clerk
Attys.

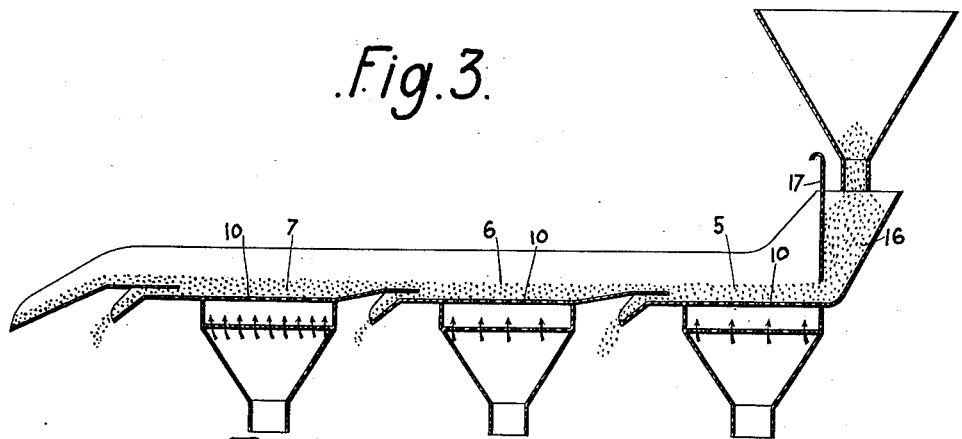
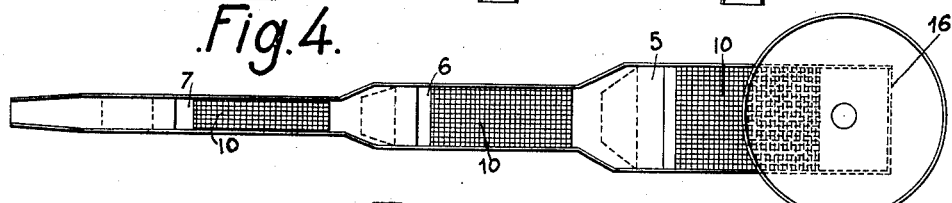
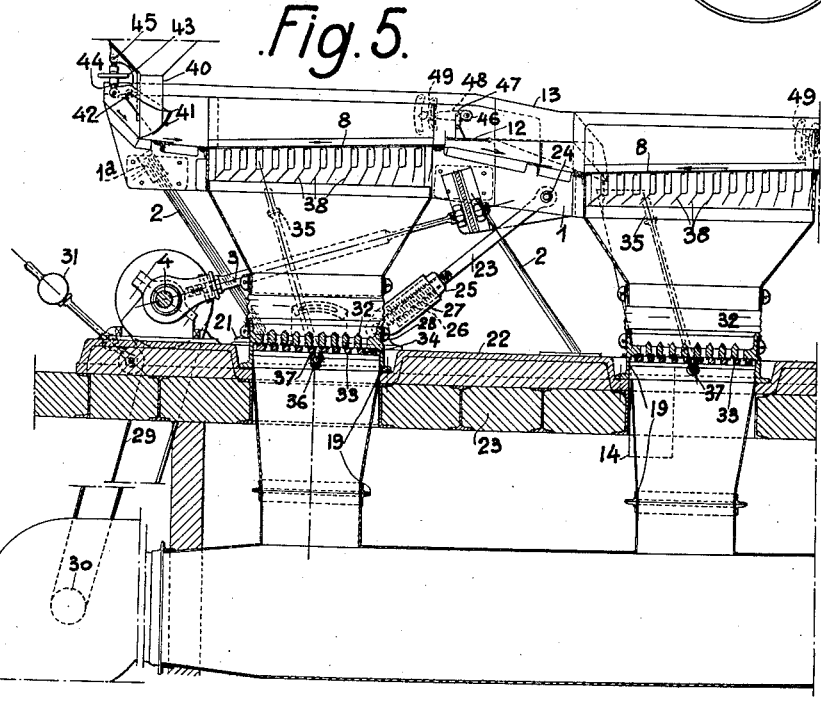

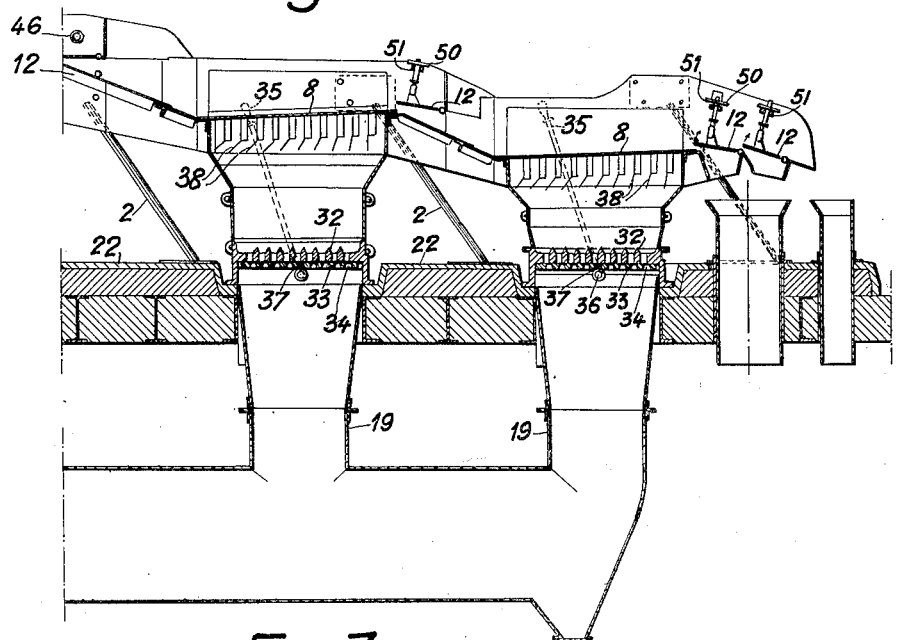
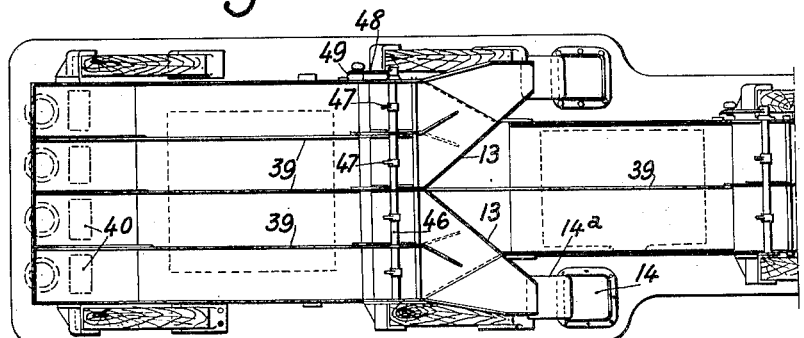
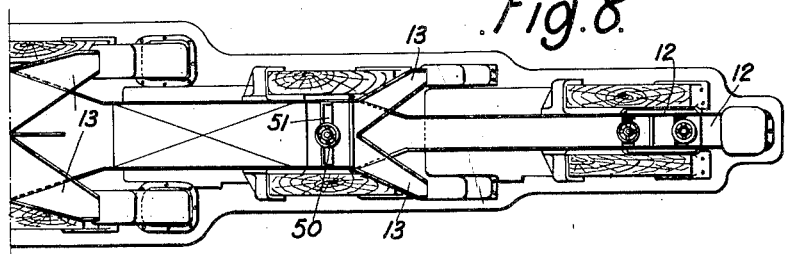

Patented July 12, 1932

1,866,951

UNITED STATES PATENT OFFICE

PAUL SOULARY, OF BRUAY-EN-ARTOIS, FRANCE

APPARATUS FOR THE PNEUMATIC SEPARATION OF MATERIALS OF DIFFERENT DENSITIES

Application filed August 12, 1929, Serial No. 385,132, and in France August 22, 1928.

The present invention has for its object to provide an apparatus for separating a mixture of materials in small pieces, of different densities, into fractions of increasing densities, and more particularly to remove the stones and other incombustible materials contained in pea coal.

When in the specification which follows the following denominations are used: coal, mixed products, schist, instead of saying materials of small density, average density and high density, it is solely for facilitating the comprehension and this does not restrict in any way the scope of the invention, and the utilization of the apparatus for carrying out the present process.

The accompanying drawings illustrate, by way of example, apparatus for carrying into practice the subject-matter of the invention.

Figure 1 diagrammatically illustrates a vertical longitudinal section of the apparatus.

Figure 2 is a corresponding plan view.

Figure 3 is a vertical longitudinal section of a constructional modification of the apparatus.

Figure 4 is a corresponding plan view.

Figures 5 and 6 together illustrate a vertical longitudinal section of a form of construction of an apparatus in accordance with the diagrammatic principle shown in Figs. 1 and 2.

Figures 7 and 8 are plan views respectively corresponding to Figs. 5 and 6.

The apparatus is essentially composed of a frame 1 supported, either by inclined links, or by inclined resilient blades 2 as shown in Fig. 2, or by any other equivalent device allowing the frame 1 to rock by means of a link 3, driven by an eccentric or a crank pin 4. The frame 1 carries a series of boxes of two types, such as 5 and 6, on the one hand, and such as 7, on the other hand.

The number of these boxes can be greater or smaller according to the material to be treated. Each box has an independent air blast inlet 19, adjustable by a damper 20, a device for rendering uniform the flux of blown air such as 8 or 9, and finally, a fine wire gauze, or a sheet-iron plate 10 provided with fine perforations serving as support for the material to be treated. The uniformizing device can be constituted by a wire gauze or a perforated sheet-iron plate, which wire gauze or sheet-iron plate can have, throughout their length, meshes or perforations of different dimensions, according to the distribution of air to be effected. This device can also be constituted by a sheet-iron plate provided with shutters 11, as shown in Fig. 1, the distribution of the air being controlled by the greater or less inclination given to the shutters 11.

The boxes are completed, on the down side, by a damper such as 12 rocking about a horizontal axis, and adjustable during the operation, according to the quality of the products which are to be taken off. These dampers allow: either to take off the light upper products, as shown for the boxes of the type 5 and 6, and in this case the light upper product is discharged through one or two troughs such as 13, or 14, whilst the heavier lower product passes in the following box where the treatment is continued; or to take off a lower heavier product, as shown for the boxes of the type 7, and, in this case, the light upper product must be collected by a trough such as 14, or caused to be treated again in the following boxes, as indicated for the first boxes 7 of Figs. 3 and 4. In these last figures, the same parts or corresponding parts are designed by the reference numbers already used for the Figures 1 to 4.

The raw material to be treated enters a hopper 16 provided with a vertical damper 17 acting as distributor, or with any other equivalent device such, for instance, as that shown in Figs. 5 to 8. The oscillations imparted to the frame 1 and the inclination of the links 2 cause the material to be treated to progress in the direction of the arrow 18, this material spreading in a regular sheet over the wire gauze 10.

Under the influence of the vertical air stream passing through the mass, the latter begins to stratify in layers of increasing density from the top downwards. Opposite the first damper 12, the sorting is already sufficiently advanced in order that the two troughs 13 of the first box may collect and discharge the portions of least density. The denser lower layers, which pass under the first damper 12, enter the second box which is appreciably narrower. Owing to this contrivance, the materials again take the form of a sheet of suitable thickness and the stratification again takes place and is completed under the influence of the ascending air stream, as in the first box. Light products can thus again be taken off by means of the damper 12 and of the side troughs 13 of the second box.

The lower layers passing under the damper 12 of the second box then enter the third box which, for the same reason as above, is appreciably narrower than the second one. The stratification is terminated in this third box. In case coal is being treated, it is thus possible to collect, through the outlet 15, pure schists by suitably adjusting the damper 12. The trough 14 then delivers pure coal if the raw material contained only two products of different density, for instance pure coal and homogeneous pure schists. Otherwise, and this is the case in which the coal to be treated contains on the one hand, mixed products and, on the other hand, schists of various densities, the trough 14 delivers coal containing, on the one hand, schists of intermediate density which have not been sorted and, on the other hand, mixed products constituted by the coupling of a particle of coal and of a particle of schist.

It is possible:

1. Either to constantly cause this coal to re-enter the feeding hopper 16. The schists it contains thus finally being guided towards the outlet 15. Concerning the mixed products, the successive manipulations break them up and separate into their two elements: coal and schists, which can then be guided towards the outlets provided for the same.

2. Or to cause this coal to enter a fourth and, if necessary a fifth box of the type 7 for instance. In this case, the last trough of the type 14 will deliver mixed products.

It is to be noted, and this is essential, that, owing to the successive diminutions in width of the boxes, the loss of coal in the schists is considerably reduced; in fact, in the case of Fig. 2 for instance, the width of the box 7 is a quarter of the width of the box 5. Therefore, if through a bad adjustment of the damper 12, 5% of coal is allowed to pass in the schist, one loses only: $1/4 \times 5\% = 1,25\%$ of the total coal subjected to the treatment.

Likewise, with four boxes of the type 5 and one box of the type 7, the width of the final box is only $\frac{1}{16}$th of the width of the first box, and it is thus possible to reduce, in the same conditions as above, the total loss to $\frac{1}{16} \times 5\% = 0,3\%$.

For another purpose, it is possible to devise an apparatus solely composed of boxes of the type 7, as shown in Figs. 3 and 4, in case the product to be treated should contain for the greater part products of higher density.

To sum up, according to the product to be treated, the apparatus will comprise a number (which can be null) of boxes of the type 5 allowing to take off a greater proportion of light products, and a number (which can be null) of boxes of the type 7 allowing to take off a smaller proportion of heavy products.

Finally, it must be noted that the apparatus can be easily controlled; its adjustment during the operation is ensured by two adjustments only: the control of the wind by means of the dampers 20, the control of the discharges by means of the dampers 12.

In the form of construction illustrated in Figs. 5 to 8, the apparatus comprises three boxes of the type 5 followed by a box which belongs both to type 5 and to type 7.

Such a form of construction presents the main following features:

(a) In order to obtain a uniform distribution and flow of the material in the sorting boxes, the first of these boxes is provided with vertical partitions arranged in the directions in which the material progresses, by providing between them longitudinal conduits each of which is individually fed with material by its own distributor.

(b) The boxes on the down side of the first one can be partitioned and have so many more partitions as they are wider, several of their longitudinal conduits thus formed feeding only one of the conduits of the following box and each of them being fed by several of the conduits of the preceding box.

(c) The admission of the air under the perforated bottom of each box is independently effected by a conduit at the entrance of which is arranged a control device constituted by superposed grids slidable relatively to each other. Moreover, the distribution of the air through the material in motion in each longitudinal conduit of one and the same box is controlled by shutters arranged immediately under the perforated bottom, and the inclination of which relatively to the vertical is determined once for all, upon adjustment of the apparatus according to the nature of the product to be treated.

(d) The boxes are supported by resiliently distortable arms the inclination of which relatively to the horizontal is at most 55 degrees, in order to give rise, in the shaking movement imparted to the boxes, to an important vertical component, the object of which is to create pulsations of the blown wind owing to successive compressions and decompressions to which is thus subjected the layer of materials.

(e) The weight of the boxes is partly supported by rigid thrust bars resting at fixed points through the medium of springs, the relaxation of which compensates the reaction of the weight of the movable parts of the apparatus on the driving links.

The apparatus in Figs. 5 to 8 comprises four boxes rigidly connected together by a frame 1 supported by the ends of resiliently distortable bars or leaf springs 2. The latter are attached, at their upper part, on brackets 1ᵃ of the frame and, at their lower part, they rest on shoes 21 secured by their sole member on a base 22 supported by a brickwork floor or arch 23.

As indicated above, the inclination of the bars or springs 2 relatively to the horizontal is preferably less than 55 degrees. The various trials effected by the applicants have shown that this arrangement is very convenient in that, all things being equal, it causes to appear in the shaking movements imparted to the boxes, a very important vertical component which has for main effect to compress and decompress the materials under treatment, this periodically increasing and diminishing the resistance of the layer formed by these materials to the passage of the air stream. Pulsations of air which accelerate the separation are thus obtained.

This feature is one of the most important of the invention owing to the industrial result it allows to obtain.

In the known apparatus used for the same purpose or for similar purposes, it has been attempted to create such air pulsations, by means of obturators: rotating shutters, rocking valves, etc., arranged between the fan and the apparatus, the links supporting the boxes or screens being vertical or approximately vertical. Moreover, exact synchronism between the air pulsations and the movements of oscillation of the apparatus had to be effected. In the apparatus forming the subject-matter of the present invention, the air pulsations are obtained without any supplementary member and they are automatically in synchronism with the movements of oscillation of the apparatus.

In accordance with another feature of the invention, the reactions of the weight of the boxes on the driving links reactions due to the accentuated obliquity of the bars or springs supporting the apparatus, are avoided as indicated hereinafter: the boxes bear through their common frame 1 on rigid thrust bars 23. The latter, pivoted at 24 on the frame 1 rest, at their lower end, on the base 22, through the medium of compression springs. In the example illustrated, the bars 23 are screw-threaded at their lower part and receive members adjustable in position, and constituted by nuts 25 which bear against coil springs 26, held against a shoulder constituted by the bottom of a socket provided in a member 27 pivoted on a fork piece 28 secured on the base 22. It will be easily understood that the relaxations of the springs 26 balance the reactions of the weight of the apparatus on the eccentric link or bar 3 which, as explained, imparts shaking movements to the frame 1. In the example of construction under consideration, the bar 3 is actuated through the shaft 4 connected, by a belt 29 to the shaft of the fan 30 which supplies air to the conduits 19 of the various boxes. In this example is shown a clutch constituted by a belt stretching device 31 which can be replaced by any other device without departing from the scope of the invention.

The general arrangement of the air conduits 19 is substantially that of the diagrammatic devices of Figs. 1 to 4, but it is completed by the following details:

At the entrance of each conduit are arranged two grids 32 and 33 in permanent contact, and one of which is fixed, whilst the other is slidable in slides 34 when an operating lever 35 is acted upon. The lever 35, to which access may be had from the exterior of the conduit, is rigidly secured on a shaft 36 which passes through the walls of this conduit and on which is rigidly secured a finger 37 extending between two adjacent bars of the movable grid 33.

The bars of the latter constitute, by moving relatively to the bars of the fixed grid 32, as many dampers allowing to control as accurately as desired, the quantity of air admitted under the perforated bottom 8. The suitable distribution of this air through the materials in motion on the bottom 8 is obtained by arranging, immediately under the said bottom, fixed or movable shutters 38, the inclination of which is adjustable according to requirements.

As already indicated, in order to uniformly distribute the materials to be classified on the perforated bottoms of the boxes, the latter are provided with vertical partitions arranged in the direction of flow of the materials in order to separate these latter in distinct parallel streams. The number of these partitions is proportionally greater as the width of the box is greater. In the form of construction illustrated, the first box has three partitions 39 which provide between them and the walls proper of the box, four longitudinal conduits, each of which is independently supplied with materials. The feeding is effected by means of troughs 40 which can be connected to a common hopper (not shown in the drawings) and provided with dampers 41 allowing to control the outflow of the troughs 40.

The dampers 41 angularly move about axes 42, so as to transversely cut the flow of materials which flows from the troughs. These dampers 41 are operated by means of handwheels 43, the hub of which constitutes a nut having right and left hand screw threads, screwed on threaded rods 44 respectively attached to the damper 41 and at a fixed point 45. Such an arrangement is convenient in that the flow of the material can be rendered uniform throughout the width of the boxes. In fact, it has been noted that in boxes which are not provided with the above improvement, the material progresses more rapidly in the axial region of the boxes than at the edges of the latter. Each of the channels provided between two adjacent partitions 39 has, at its outlet end, one or more shutters 12, the inclination of which relatively to the horizontal can be adjusted so as to separate the layers of superposed materials by order of density. The upper layer is discharged, through two troughs 13, into conduits 14 opening above the upper face of the base 22. Each of the troughs 13 is fed by two of the channels formed between the partitions 39, at their lower part, which communicate with each of the channels of the following box which, being of lesser width than the preceding one, has only one partition 39 axially arranged. The shutters 12 of the two first boxes are simultaneously operated by one and the same transverse shaft 46, connected by links 47 to the said shutters and provided, externally to the box, with a control lever 48, which can be locked, in the chosen position, on a fixed sector 49. The third box has only one shutter 12 operated by a hand wheel forming a nut 50 bearing on a fixed cross member 51. The two last boxes, of reduced width, have no longitudinal partition, and at the outlet of the last box are provided two shutters 12, such as that of the preceding box, which allow of collecting, in case the coal is sorted, and from the bottom upwards, schists, mixed products of second quality, and mixed products of first quality.

The constructional arrangements described with reference to the accompanying drawings, are given by way of example only. They can be modified without altering the principle of the operation, or the object sought, and without departing from the scope of the invention.

What I claim as my invention and desire to secure by Letters Patent is:—

1. In an apparatus of the type indicated, in combination, boxes with perforated substantially horizontal bottom, a wall for connecting two adjacent boxes, partitions for separating layers of materials of a known type but arranged above the said wall, a tight enclosure under each of the boxes, means for independently admitting the blown air into each of the said enclosures and means for uniformly distributing the said air under the perforated bottom of the box, means for imparting to the said boxes periodical shaking movements which agitate the treated materials so that the air admitted in a continuous manner passes through the said materials in the form of pulsations.

2. In an apparatus of the type indicated, in combination, boxes with perforated substantially horizontal bottom, a wall for connecting two adjacent boxes, partitions for separating layers of materials of a known type but arranged above the said walls, a tight enclosure under each of the boxes, means for independently admitting the blown air into each of the said enclosures and means for uniformly distributing the said air under the perforated bottom of the box, resiliently distortable arms for supporting the said boxes, the inclination of the said arms relatively to the horizontal being 55 degrees at most, rigid push bars inclined in the opposite direction of the said arms and connected at one end on the boxes while their other end bears on fixed points through the medium of springs, means for applying to the boxes periodical pressures which the arms and bars transform into movements so that the air admitted continuously under each box passes in the form of pulsations through the layers of materials which travel on the perforated bottom of the said box.

3. In an apparatus of the type indicated, in combination, boxes with perforated substantially horizontal bottom, a wall for connecting two adjacent boxes, partitions for separating layers of materials arranged above the said walls, a tight enclosure under each of the boxes, means for admitting independently the blown air into each of the said enclosures and means for uniformly distributing the said air under the perforated bottom of the box, vertical partitions arranged parallelly throughout the entire length of the perforated bottom of each box, the number of the said partitions increasing with the width of the box, resiliently distortable arms for supporting the boxes, the inclination of the said arms relatively to the horizontal being 55 degrees at most, rigid push bars inclined in the opposite direction of the said arms and connected at one end on the boxes while their other end bears on fixed points through the medium of springs, means for applying to the boxes periodical pressures which the arms and the bars transform into movements so that the air admitted continuously under each box passes in the form of pulsations through the layers of materials which travel on the perforated bottom of the said box.

In testimony whereof I have signed this specification.

PAUL SOULARY.